(12) United States Patent
Schmidt et al.

(10) Patent No.: US 9,273,789 B2
(45) Date of Patent: Mar. 1, 2016

(54) TRIPLE OFFSET BUTTERFLY PRESSURE RELIEF VALVE

(71) Applicant: Enviro Valve (US) Inc., Broken Arrow, OK (US)

(72) Inventors: Curtis Schmidt, Broken Arrow, OK (US); Johnny Marvin Bowyer, Jr., Broken Arrow, OK (US); James R. Kerian, Broken Arrow, OK (US)

(73) Assignee: Enviro Valve (US) Inc., Broken Arrow, OK (US)

( * ) Notice: Subject to any disclaimer, the term of this patent is extended or adjusted under 35 U.S.C. 154(b) by 243 days.

(21) Appl. No.: 14/015,364

(22) Filed: Aug. 30, 2013

(65) Prior Publication Data

US 2015/0059881 A1 Mar. 5, 2015

(51) Int. Cl.
| F16K 17/02 | (2006.01) |
| F16K 31/524 | (2006.01) |
| F16K 1/20 | (2006.01) |
| F16K 17/14 | (2006.01) |

(52) U.S. Cl.
CPC ............... *F16K 17/02* (2013.01); *F16K 1/205* (2013.01); *F16K 1/2007* (2013.01); *F16K 17/14* (2013.01); *F16K 31/52441* (2013.01); *Y10T 137/7898* (2015.04)

(58) Field of Classification Search
CPC ... F16K 17/02; F16K 31/52441; F16K 17/14; F16K 1/205; F16K 1/2007; Y10T 137/7898
USPC ................................... 137/527; 251/303, 307
See application file for complete search history.

(56) References Cited

U.S. PATENT DOCUMENTS

| 2,349,145 A | 5/1944 | Darnell |
| 2,487,104 A | 11/1949 | Cooper |
| 2,946,553 A | 7/1960 | Adam |
| 3,658,293 A | 4/1972 | Gaebel |
| 3,843,090 A | 10/1974 | Schneider et al. |
| 3,967,813 A | 7/1976 | Frohlich |
| 4,319,714 A | 3/1982 | Moulene et al. |
| 5,118,078 A | 6/1992 | Younker |

(Continued)

FOREIGN PATENT DOCUMENTS

GB 2278905 12/1994

OTHER PUBLICATIONS youtube.com, AccuShear Pressure Relief Device, Enviro Valve Inc., XP 54975578, published Jul. 23, 2013.

(Continued)

*Primary Examiner* — Kevin Lee
*Assistant Examiner* — P. Macade Nichols
(74) *Attorney, Agent, or Firm* — GableGotwals

(57) ABSTRACT

A pressure relief valve in a triple offset butterfly valve configuration. It has a body, pallet, pallet assembly and closure mechanism with a lever arm providing mechanical advantage upon a cam which aids in the closing of the valve. The valve relies upon a shear pin which can be machined to alter the opening pressure of the valve. The pallet is secured to the pallet assembly by a plurality of adjustment fasteners and retainer fasteners which can be adjusted to provide an effective seal on the valve. A valve seal has one or more layers of graphite and metal. A pallet seal is captured in a groove in the pallet which restricts radial movement of the pallet seal. The valve seal is captured between a retainer and the pallet seal.

13 Claims, 4 Drawing Sheets

(56) References Cited

U.S. PATENT DOCUMENTS

| | | |
|---|---|---|
| 5,871,203 A | 2/1999 | Gasaway |
| 5,957,428 A | 9/1999 | Yokota |
| 7,506,858 B2 | 3/2009 | Brinks |
| 8,286,938 B2 | 10/2012 | Helfer et al. |
| 8,348,235 B2 | 1/2013 | Higgs |
| 2011/0259436 A1 | 10/2011 | Fritts |
| 2012/0319022 A1 | 12/2012 | Helfer et al. |

OTHER PUBLICATIONS youtube.com, 12inValve, Enviro Valve Inc., XP 54975579, published Jul. 23, 2013.

TRIPLE OFFSET BUTTERFLY PRESSURE RELIEF VALVE

FIELD OF THE INVENTION

The present invention relates generally to pressure relief valves. More particularly, the present invention relates to an improved butterfly pressure relief valve with a closing mechanism.

BACKGROUND OF THE INVENTION

Pressure relief valves are used in numerous applications where an over pressure event can have catastrophic effects. Such over pressure situations can lead to a rupture of the piping or pressure vessel and in certain situations explosion and fire. Pressure relief valves provide a safe way to release the contained fluid when the set pressure is exceeded.

Pressure relief valves come in many different forms. The most common are a simple valve that is held closed by a spring in compression. When the force on the valve exceeds the strength of the spring the valve opens to release the pressure. Once the pressure drops the spring returns the valve to a closed state. Thus the valve can be reused. This design is difficult to incorporate on larger diameter pressure relief valves that require an immediate opening valve.

Other pressure release valves rely on a disk that ruptures when the force of the pressure exceeds the strength of the disk. While this may work better on larger diameter lines, it requires a significant amount of time and labor to replace the disc. Thus the valve is not easily reset.

Butterfly valves have been used as pressure relief valves. They provide an effective way to release over pressure on a large diameter lines. However, their design limitations have proven inadequate for low and high pressure applications. These valves also have a history of being unreliable and difficult to seal. It has also proven difficult to obtain sufficient force or torque to close these valves.

What is needed, therefore, is an improved valve design that can be used on large diameter, low and high pressure lines that provides a reliable opening pressure. Further it would be beneficial to have a valve that can be easily closed after being triggered. Additional improvements are needed to ensure a reliable seal on these valves.

BRIEF SUMMARY OF THE INVENTION

The present invention achieves its objectives by providing a pressure relief valve in a triple offset butterfly valve configuration. The valve has a body, pallet assembly and closure mechanism with a lever arm providing a mechanical advantage upon a cam. This aids in the closing of the valve. The valve relies upon a shear pin which can be machined to alter the opening pressure of the valve.

Further the pallet of the valve is secured to the pallet assembly by a plurality of adjustment fasteners and retainer fasteners which can be adjusted to provide an effective seal on the valve.

The present invention may also include an adjustable pin carrier on the shaft to provide further angular adjustment of the shaft in the closed position.

The present invention also has a valve seal comprised of one or more layers of graphite and metal. A seal between the pallet and valve seal is achieved by a pallet seal captured in a groove in the pallet which restricts radial movement of the pallet seal. The valve seal is further captured between a retainer and the pallet seal.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
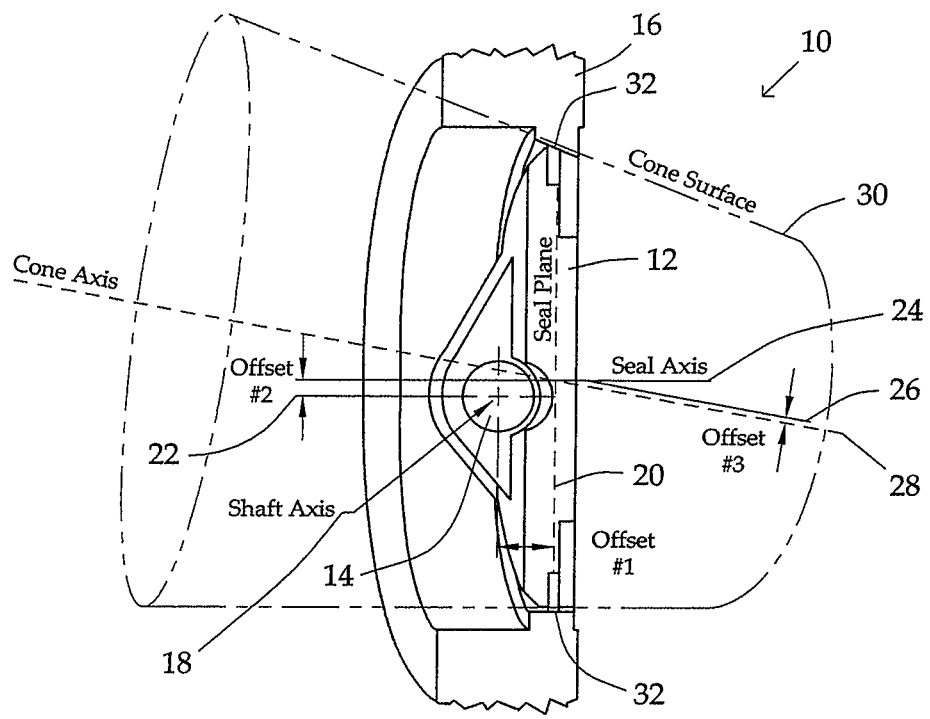
FIG. 1 is a cross section illustration of a triple offset butterfly valve.

Turning now to the drawings wherein like reference characters indicate like or similar parts throughout, FIG. 1 illustrates a cross section of a triple offset butterfly valve 10. The valve has a pallet 12 carried on a rotating shaft 14 such that the pallet 12 and shaft 14 can be rotated between an open and closed position within the valve body. 16. The valve 10 is configured such that the vertical center line 18 of the shaft 14 is offset from the seal plane 20. This is the first offset. The second offset is that the horizontal center line 22 of the shaft 14 is offset from the seal axis or center line 24 of the valve 10. The third offset occurs from the center line 26 of the pallet 12 being offset from the center line 28 of cone surface 30 on which the interior surface 32 of the valve 10 is cut The preferred embodiment pressure relief valve of the present invention 50, as seen in FIGS. 2-5 uses the geometry of the triple offset valve. It has a body 52, a pallet assembly 54 and a closing mechanism 56. The pallet assembly 54 has a shaft 58 which is pivotally mounted relative to the body 52. In the preferred embodiment of the shaft 58 passes through two holes 60 in the side 62 of the body 52. A pallet support 64 is fixedly attached to the shaft 58. A cam 66 with a cammed surface 68 is fixedly attached to the shaft 58.

The closing mechanism 56 has a lever arm 70 which is pivotally attached to a bracket 72. The bracket 72 is fixedly attached to the valve body 52. A portion 74 of the lever arm 70 is located such that it bares against the cammed surface 68. In the preferred embodiment the pivotal connection 76 between the lever arm 70 and the bracket 72 is arranged such that lever arm 70 can provide a mechanical advantage against the cammed surface 68 which helps rotate the cam 66 and pallet assembly 54 to a closed position as seen in FIG. 2.

An aperture 78 passes through the bracket 72 and cam 66. The aperture 78 is located such that the aperture 78 in the bracket 72 aligns with the aperture 78 in the cam 66 when the pallet assembly 54 is in the closed position. A shear pin 80 can then be inserted into the aperture 78. When the pressure on the pallet 82 exceeds the preset pressure the force exerted on the shear pin 80 causes it to fail along the interface(s) 84 between the cam 66 and the bracket 72.

Figure 2:
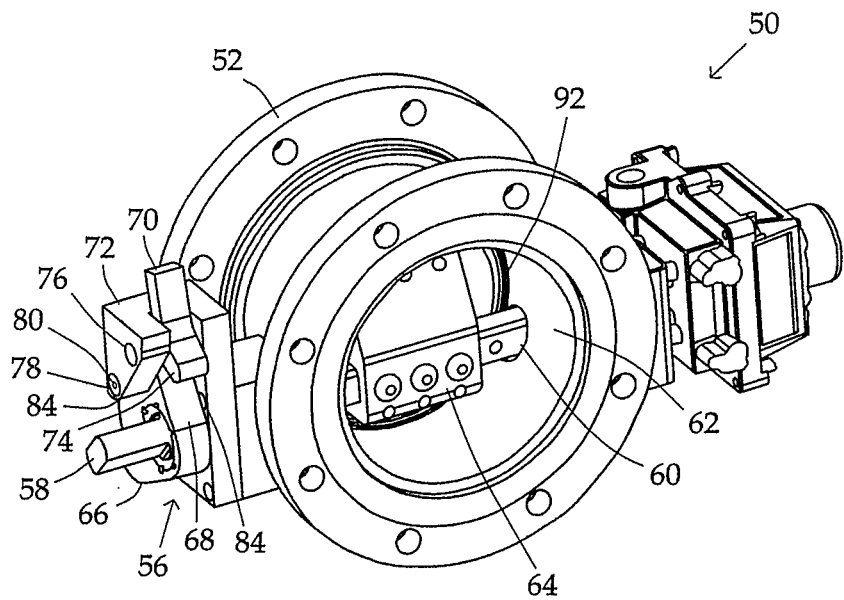
FIG. 2 is a perspective view of the pressure relief valve of the present invention.
Figure 3:
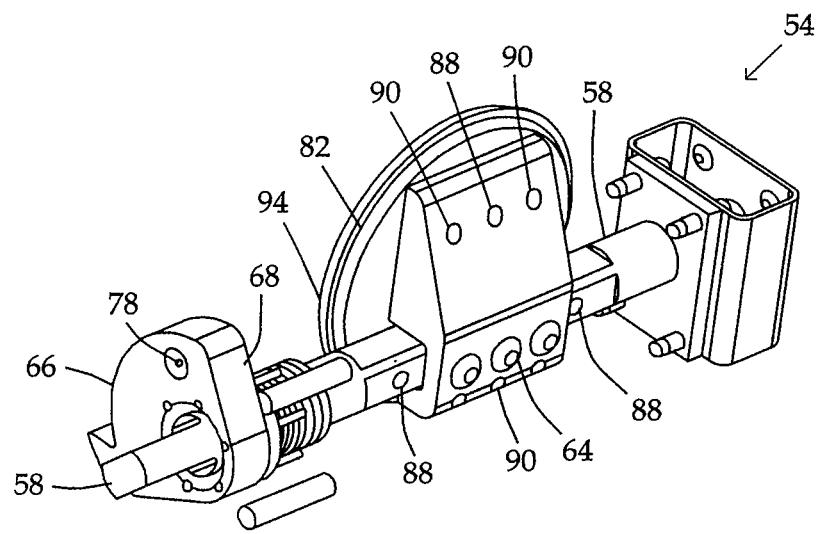
FIG. 3 is a perspective view of the pallet assembly of the present invention.
Figure 5:
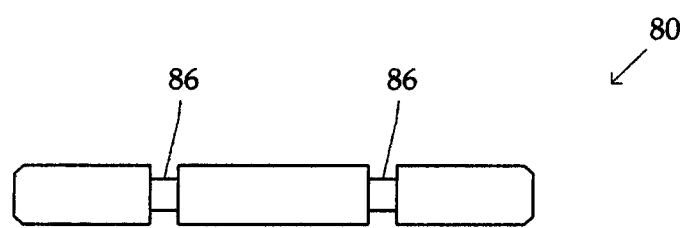
FIG. 5 is a side view of a shear pin of the preferred embodiment.

In the preferred embodiment as seen in FIGS. 2 and 3 the cam 66 and bracket 72 are constructed such that there are two interfaces 84. In this embodiment a shear pin 80 as seen in FIG. 5 can be machined to provide two necks 86 which align with the interfaces 84 when the shear pin 80 is placed in the aperture 78. Thus the release pressure can be adjusted by adjusting the dimensions of the necks 86 in the shear pin 80. If there is only one interface 84 then it is only necessary to cut one neck 86 into the shear pin 80.

The pallet 82 is secured to the pallet support 64 and shaft 58 by a plurality of adjustment fasteners 88 in compression and a plurality of retainer fasteners 90 in tension. In the preferred embodiment shown in FIGS. 2 and 3 the adjustment fasteners 88 are arranged in a rectangular configuration. Likewise the retainer fasteners 90 are also arranged in a rectangular configuration which is inverted with regard to the adjustment fasteners 88. By adjusting the adjustment fasteners 88 and the retainer fasteners 90 the location of the pallet 82 relative to the throat 92 of the valve 50 can be adjusted and held in place. This provides a mechanism to adjust the pallet 82 to an orientation where it provides an effective seal. Other embodiments of the present invention may use more or fewer fasteners 88 and 90 as well as different configurations of their layout.

Figure 4:
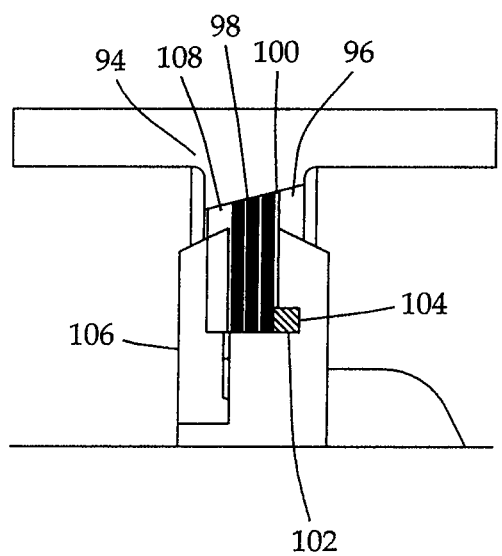
FIG. 4 is a sectional view of the pallet and seal of the present invention.

FIG. 4 provides a cross sectional view of the preferred embodiment of the valve seal 94 for the present invention. The valve seal 94 is located on the peripheral edge 96 of the pallet 82. It has one or more layers of graphite 98 and one or more layers of metal 100. In the preferred embodiment the metal 100 is stainless steel. While the number of layers and exact materials may vary, the preferred embodiment shown in FIG. 4 has three layers of graphite 98 and three layers of stainless steel 100. The pallet 82 also has a pallet seal 102 which is captured in a groove 104 in the pallet 82. The groove 104 is orient to prevent radial movement of the pallet seal 102. The valve seal 94 is captured between the pallet seal 102 and a retainer 106. The outer edge 108 of the valve seal 94 is chamfered preferable along cone surface 30 shown in FIG. 1.

Figure 6:
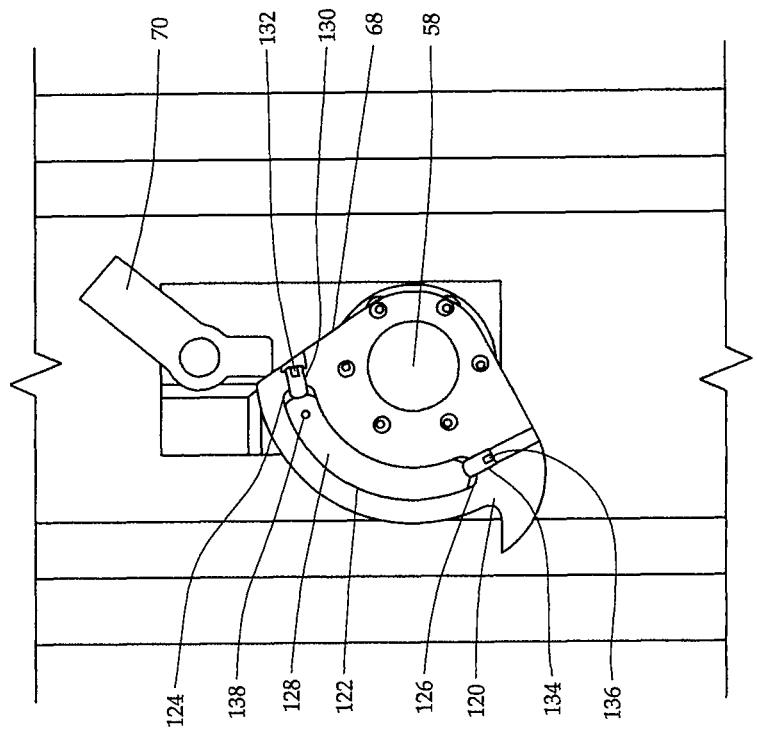
FIG. 6 is a sectional view of the preferred embodiment of the cam of the present invention showing the shear pin carrier and no bracket.

FIG. 6 shows a sectional view of an alternate embodiment of the cam 120. Here a slot 122 extends through the cam 166. The slot 122 is preferably arc shaped and has a first and second end 124 and 126. A shear pin carrier 128, with an aperture 138 passing through it, is shaped to fit into the slot 122 and is shorter than the length of the slot 122. This allows the shear pin carrier 128 to move within the slot 122.

When the valve 50 is in the closed position and the shear pin 80 is inserted. It passes at or near the first end 124 of the slot 122. A first threaded hole 130 passes through the cam 120 and into the first end 124 of the slot 122. A first threaded set screw 132 is located in and engages with the first threaded hole 130. The second end 126 of the slot 122 has a second threaded hole 134 which passes through the cam 120 and into the second end 126 of the slot 122. A second threaded set screw 136 threadedly engages the second threaded hole 134. The set screws 132 and 136 contact the shear pin carrier 128 such that the position of the shear pin carrier 128 within the slot 122 can be adjusted by the amount the set screws 132 and 136 extend into the slot 122.

Figure 7:
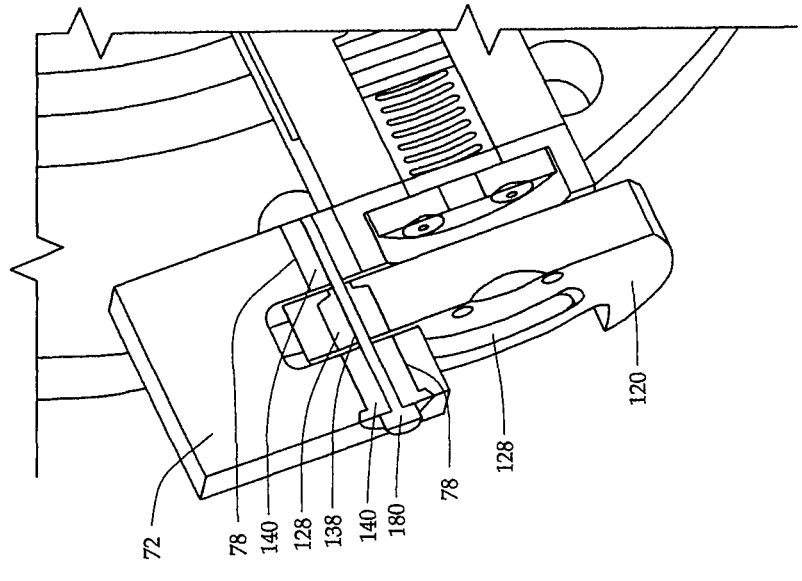
FIG. 7 is a sectional view of the preferred embodiment of the closing mechanism showing the aperture, shear pin and shear pin carrier.

As best seen in FIG. 7 the shear pin 80 passes through the apertures 78 and 138. The apertures 78 and 138 may or may not be lined with bushings 140. The bushings 140 help prevent wear in the apertures 78 and 138 which could lead to misalignment of the pallet 82 in the valve 50 which can contribute to leaks.

To aligning the pallet 82, the pallet assembly 54 is moved to a closed position. The pallet 82 is then adjusted relative to the pallet support 64 and shaft 58 through manipulation of the adjustment fasteners 88 and retention fasteners 90. Once adjusted to provide a seal between the pallet 82 and throat 92, the shear pin 80 is inserted through the apertures 78 in the bracket 72 and the aperture 138 in the shear pin carrier 128. Additional torque can be placed on the closing mechanism 56 by adjusting the location of the shear pin carrier 128 within the slot 122 through operation of the set screws 132 and 136.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A pressure relief valve comprising:
   a body, pallet assembly and closing mechanism
   the pallet assembly having a shaft pivotally mounted relative to the body, a pallet support fixedly attached to the shaft, a pallet attached to the pallet support, a cam fixedly attached to the shaft, the cam having a cam surface;
   the closing mechanism is fixedly attached to the body, the closing mechanism having a closing lever pivotally attached to a bracket such that it can bare against the cam surface to provide a mechanical advantage in rotating the shaft;
   wherein the valve is arranged in a butterfly triple offset configuration and the pallet moves from a closed position to an open position when a predetermined pressure is exerted on the pallet.

2. The pressure relief valve of claim 1 further comprising a valve seal mounted in a peripheral edge of the pallet, the valve seal having at least one layer of graphite material and at least one layer of metal and a chamfered peripheral edge.

3. The seal of claim 2 further comprising a pallet seal captured between the valve seal and a groove in the pallet, the groove being oriented such that it restricts the radial movement of the pallet seal.

4. The seal of claim 3 further comprising a retainer securing the valve seal to the pallet.

5. The at least one layer of metal of claim 2 comprising at least one layer of stainless steel.

6. The valve of claim 1 further comprising the pallet being adjustably mounted to the pallet support by a plurality of retainer fasteners and a plurality of adjustment fasteners, wherein the plurality of retainer fasteners are in tension and the plurality of adjustment retainers are in compression.

7. The valve of claim 6 further comprising the plurality of retainer fasteners are in a triangle configuration.

8. The valve of claim 6 further comprising the plurality of adjustment fasteners are in a triangle configuration.

9. The valve of claim 1 further comprising
   an arc shaped slot located in the cam having a first end and a second end and a given length;
   an arc shaped shear pin carrier located in the arc shaped slot having a given length which is less than the length of the slot;
   the aperture of the cam passing through the shear pin carrier;
   a first threaded hole passing through the cam and into the first end of the slot;
   a second threaded hole passing through the cam and into the second end of the slot;

a first set screw threadedly engaging the first threaded hole; and a second set screw threadedly engaging the second threaded hole.

10. The valve of claim 9, wherein the location of the shear pin carrier in the slot is adjustable through operation of the first and second set screws.

11. The valve of claim 10, wherein an additional torque placed on the closing mechanism is through operation of the first and second set screws.

12. A pressure relief valve comprising:
   a body, a pallet assembly and a closing mechanism in a triple offset butterfly valve arrangement;
   the pallet assembly having a shaft pivotally mounted relative to the body, a pallet support fixedly attached to the shaft, a pallet attached to the pallet support; and
   the closing mechanism is fixedly attached to the body;
   wherein additional torque is placed on the closing mechanism when the pallet is in a closed position and the pallet moves from the closed position to an open position when a predetermined pressure is exerted on the pallet.

13. The valve of claim 12, the closing mechanism further comprising:
   a cam fixedly attached to the shaft, the cam having a cam surface; and
   a closing lever pivotally attached to a bracket such that it can bare against the cam surface capable of providing a mechanical advantage in rotating the shaft.

* * * * *